US012769928B2

(12) United States Patent
Smith et al.

(10) Patent No.: US 12,769,928 B2
(45) Date of Patent: Oct. 20, 2026

(54) INTELLIGENT POE SENSOR ARCHITECTURE, SYSTEM AND METHOD

(71) Applicant: Sensor 42, LLC, San Marcos, CA (US)

(72) Inventors: David Smith, Carlsbad, CA (US); Alan LeVezu, Oceanside, CA (US); Karl LeVezu, Oceanside, CA (US); David Norris, Jr., Temecula, CA (US)

(73) Assignee: SENSOR 42 LLC, San Marcos, CA (US)

(*) Notice: Subject to any disclaimer, the term of this patent is extended or adjusted under 35 U.S.C. 154(b) by 0 days.

(21) Appl. No.: 19/172,580

(22) Filed: Apr. 7, 2025

(65) Prior Publication Data

US 2025/0378260 A1 Dec. 11, 2025

Related U.S. Application Data

(63) Continuation of application No. 16/867,532, filed on May 5, 2020, now abandoned.

(51) Int. Cl.

| | |
|---|---|
| ***G06F 40/143*** | (2020.01) |
| ***G06F 40/14*** | (2020.01) |
| ***H04L 12/10*** | (2006.01) |
| ***H04L 67/12*** | (2022.01) |
| ***H04Q 9/00*** | (2006.01) |

(52) U.S. Cl.

CPC ............ *G06F 40/143* (2020.01); *G06F 40/14* (2020.01); *H04L 12/10* (2013.01); *H04L 67/12* (2013.01); *H04Q 9/00* (2013.01); *H04Q 2209/30* (2013.01); *H04Q 2209/823* (2013.01); *H04Q 2209/826* (2013.01); *H04Q 2209/88* (2013.01)

(58) Field of Classification Search

CPC ....... G06F 40/143; G06F 40/14; H04L 12/10; H04L 67/12; H04L 67/02; H04L 67/125; H04Q 9/00; H04Q 2209/30; H04Q 2209/823; H04Q 2209/826; H04Q 2209/88

See application file for complete search history.

(56) References Cited

U.S. PATENT DOCUMENTS

| | | | | |
|---|---|---|---|---|
| 6,238,338 | B1 * | 5/2001 | DeLuca | A61B 5/0024 128/903 |
| 2003/0110652 | A1 * | 6/2003 | Greway | G01C 9/18 33/366.18 |
| 2005/0007597 | A1 | 1/2005 | Hall | |
| 2014/0017663 | A1 | 1/2014 | Steinman et al. | |
| 2014/0358472 | A1 * | 12/2014 | Goel | G06F 3/05 702/141 |
| 2015/0172151 | A1 | 6/2015 | Bottalico et al. | |
| 2015/0333918 | A1 * | 11/2015 | White, III | H04L 12/10 713/300 |
| 2016/0051169 | A1 | 2/2016 | Hong et al. | |

* cited by examiner

*Primary Examiner* — Omeed Alizada

(74) *Attorney, Agent, or Firm* — Gary L. Eastman, Esq.; Eastman IP

(57) ABSTRACT

Embodiments of Power Over Ethernet sensors providing processed signals directly to User devices or via a sensor processing system. Other embodiments may be described and claimed.

1 Claim, 15 Drawing Sheets

INTELLIGENT POE SENSOR ARCHITECTURE, SYSTEM AND METHOD

RELATED APPLICATIONS

This patent application is a continuation of U.S. patent application Ser. No. 16/867,532, filed on May 5, 2020, and currently co-pending, which is a continuation of U.S. patent application Ser. No. 16/271,345, now U.S. Pat. No. 10,681,434, filed on Feb. 8, 2019, which claims the benefit of priority to United States Provisional Patent Application No. 62/628,276, filed on Feb. 8, 2018, the entirety of which is incorporated herein by reference.

TECHNICAL FIELD

Various embodiments described herein relate generally to digital sensors, including digital sensor apparatus, systems, and methods.

BACKGROUND INFORMATION

It may be desirable to provide a digital sensor that provides intelligent sensor signals.

DETAILED DESCRIPTION

In an embodiment, a User 136 may want to employ a sensor device or apparatus 12A-E in a remote or harsh environment 50A-50B. The environment 50A-50B where a User 136 may wish to employ a sensor device may also have limited or no wireless conductivity. Further, a User 136 may want real time sensor data or alerts as a function of the sensor device's function or use. In addition, a User 136 may want or need to receive processed sensor information from a sensor device 12A-E versus sensor signals where the processed information may represent the combination of data from several sensors. The sensor signals correlation to measured values may vary by sensor devices or applications. In an embodiment, the sensor device 12A-E may receive operational energy and communicate signals via a signal connector 184 including via a Power over Ethernet (POE) compliant interface and connector 184. In an embodiment, the sensor devices 12A-E may be Intelligent POE sensors (IPS) devices.

Figure 8A:
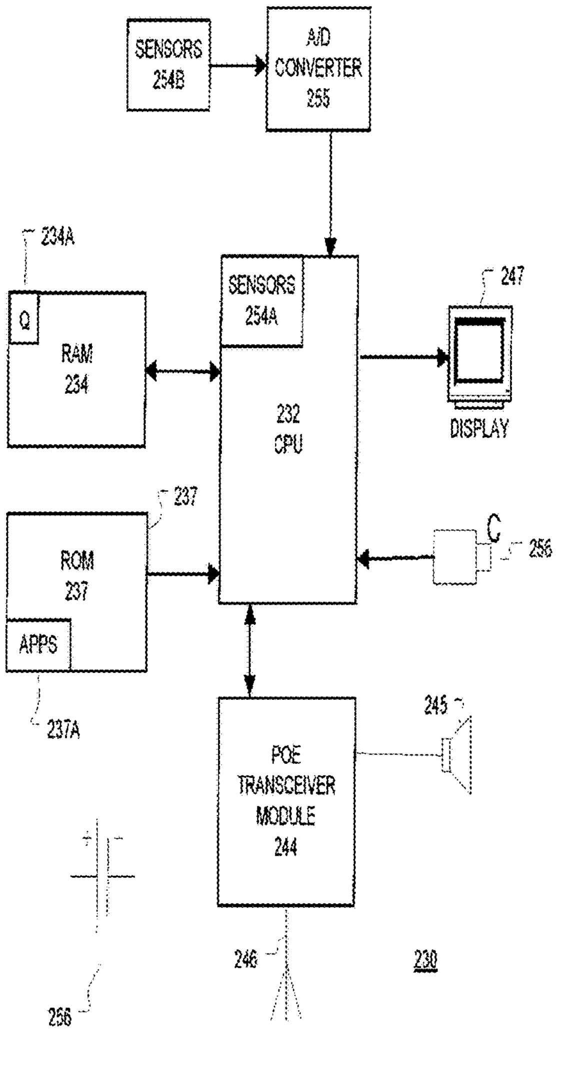
FIG. 8A is a block diagram of an article according to various embodiments.
Figure 9:
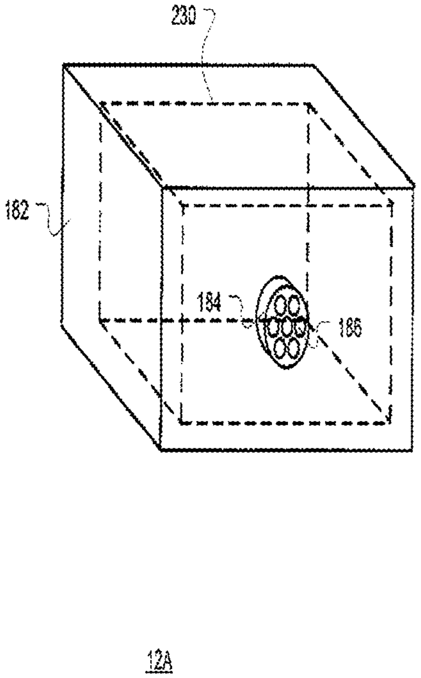
FIG. 9 is a simplified diagram of an IPS device according to various embodiments.

FIG. 9 is a simplified diagram of an IPS device 12A according to various embodiments. As shown in FIG. 9, an IPS device 12A may include sensor hardware 230 (shown in FIG. 8A) coupled to a multiple pin 186 electrical connector 184 in a housing 182. In an embodiment, the housing 182 may provide a hermetic and insulated environment for the sensor hardware 230 including in underwater applications. The electrical connector 184 may enable wet environment connections including underwater connections in an embodiment. In an embodiment, a User 136 may employ or deploy many IPS devices 12A-E at various locations as a function of sensor types, environment, application, and tolerances. In an embodiment, a User 136 via their device 22A may communicate directly (FIG. 2), indirectly (FIG. 1) with an IPS device 12A-12E to request and receive processed sensor information, or a combination of both.

Figure 1:
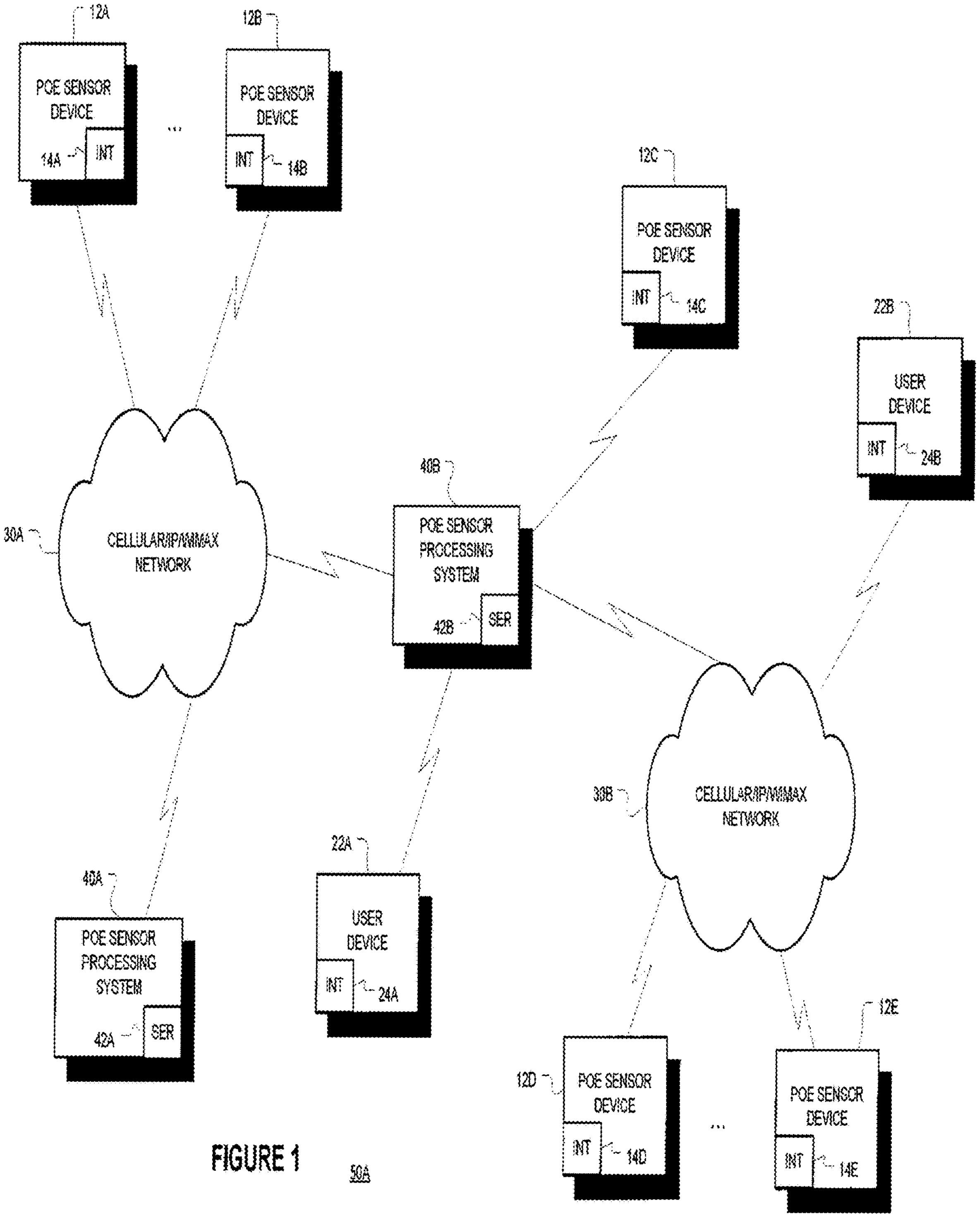
FIG. 1 is a block diagram of an intelligent Power over Ethernet (POE) sensor (IPS) architecture according to various embodiments.

FIG. 1 is a block diagram of intelligent POE sensor (IPS) architecture 50A according to various embodiments. As shown in FIG. 1, IPS architecture 50A includes a first and a second IPS processing systems 40A, 40B, several IPS devices 12A-E, several user devices 22A-B, and wired/wireless networks 30A, 30B. In an embodiment, an IPS processing system (IPS processing system) 40A, 40B may process POE sensor device signals and may communicate processed sensor data and other information and controls with IPS devices 12A-E and User devices 22A-22B via a wired, wireless, or combination of both connections 30A, 30B. In an embodiment, an IPS device 12A-E may communicate initially via a wired connection to a network 30A, 30B and then may be communicated to an IPS system 40A, 40B or User device 22A-22B via any combination of wired and wireless connections.

An IPS processing system 40A, 40B may include a multimedia server 42A, 42B that may enable HTML and other communications between an IPS processing system 40A, 40B and a plurality of wired Ethernet networked IPS devices 12A-E and wired, wireless, or combination of both networked User devices 22A-B. An IPS processing system 40A, 40B may employ an application specific integrated circuit (ASIC) (274 FIG. 7B) to transceive signals directly or indirectly with wired Ethernet networked IPS devices 12A-E and wired, wirelessly, or combination of both networked User devices 22A-B. An IPS processing system 40A, 40B server 42A, 42B may be a webserver that communicates data that may be processed by a web browser application 23 resident on a User device 22A-B.

In an embodiment, an IPS processing system 40A, 40B server 42A, 42B may generate Hyper Text Markup Language (HTML) encoded data that a User device 22A-22B may process via a resident web browser 23. As shown in FIG. 4C, the HTML pages may include sensor information 77C. The information 77C may include formatted sensor information including graphs, charts, numerical data, comparison, alerts, ranges, averages and other statistical information 78C for one or more sensors 75C to 76C associated or communicating with the IPS processing system 40A-40B.

In an embodiment, an IPS device 12A-12E may also include a sensor data server 16A may be include a webserver that communicates data that may be processed by a web browser application 23 resident on a User device 22A-B. In an embodiment, an IPS device 12A-12E sensor data server 16A may generate Hyper Text Markup Language (HTML) encoded data that a User device 22A-22B may process via a resident web browser 23. As shown in FIG. 4D, the HTML pages may include sensor information 77D. The information 77D may include formatted sensor information including graphs, charts, numerical data, comparison, alerts, ranges, averages and other statistical information 78D for one or more sensors 75D to 76D associated with the IPS device 12A-12E.

In an embodiment, an IPS processing system 40A, 40B server 42A, 42B may communicate data including media to a User device (UD) 22A-22B using other protocols including application specific protocols. A UD 22A-22B may include a program to decode/encode the application specific protocol communications between the UD 22A-22B and an IPS processing system 40A, 40B. Similarly, an IPS processing system 40A, 40B server 42A, 42B may communicate data with an IPS device 12A-12E using other protocols including application specific protocols. An IPS device 12A-12E may include a program to decode/encode the application specific protocol communications between the IPS device 12A-12E and an IPS processing system 40A, 40B.

As shown in FIG. 1, an IPS device 12A-12E may be coupled with an IPS processing system 40A, 40B via a network 30A. The network 30A may be a local network or a network of networks and include wired and wireless communication networks. An IPS device 12C may be coupled directly or indirectly to an IPS processing system 40B via a wired connection including an Ethernet connection. In another embodiment, an IPS device 12D, 12E may communicate with an IPS processing system 40B via a network 30B. Similarly, a UD 22A may be coupled directly to an IPS processing system 40B via a wired connection including an Ethernet connection. In another embodiment, a UD 22B may communicate with an IPS processing system 40B via a network 30B.

Figure 10:
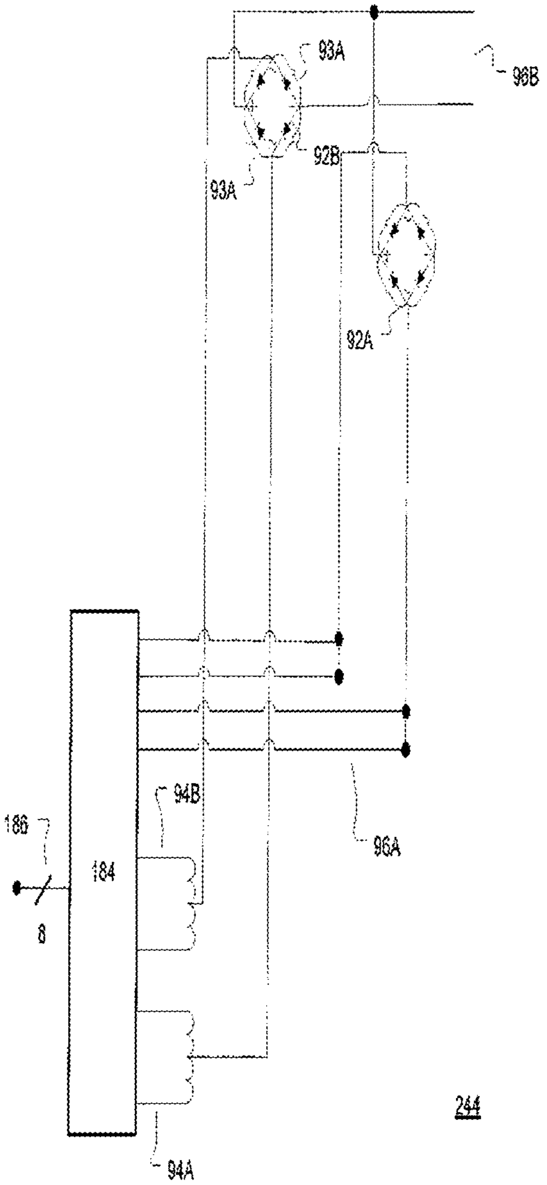
FIG. 10 is a simplified diagram of a POE module according to various embodiments.

The networks 30A, 30B may be local networks or a network of networks and support/enable combinations of wired and wireless communication. An IPS device 12A-12E may include a POE interface 14A-14E (233 FIG. 10) that enables wired IP based communication with an IPS processing system 40A, 40B. As shown in FIG. 10, a POE interface 14A-14E may communicate data over data lines 96A and receive power 96B over the data lines 96A and power lines via transformers 94B, diode bridges 92A, 92B and switches 93A as a function of the POE power class. The network 30A, 30B may include local networks, a network of networks, or a worldwide network of networks, termed the "Internet", cellular network, or WiMAX networks. In an embodiment, a UD 22A-B may communicate with an IPS processing system 40A, 40B via several networks. It is noted that in an embodiment, the networks 30A, 30B may be support industrial, scientific and medical (ISM) radio bands, Groupe Special Mobile (GSM), Code-division multiple access (CDMA), time division multiple access (TDMA), mesh, and short messaging system (SMS) based network, WiMAX, IP (wired, wireless, or combination of both network) such as 802.11a, b, g, n networks.

A network 30A, 30B may be a terrestrially based network or satellite-based network, or combination thereof. Each UD 22A-22B may include an interface 24A-24B that enables communication between a UD 22A-22B and an IPS processing system 40A, 40B via a network 30A, 30B directly or indirectly. In an embodiment, a UD 22A-22B may be cellular device such an iPhone® or other smartphone, tablet device including an iPad®, laptop, tablet, desktop, or other electronic device capable of communicating via one or more wired, wireless, or combination of both protocols and capable of electronically reading an image. In an embodiment, an IPS processing system 40A, 40B may be an electronic device 260 (FIG. 8B) that may include a module 274 to communicate signals with a UD 22A-22B and IPS devices 12A-12E. An IPS processing system 40A, 40B may also include a server 42A, 42B (292, FIG. 7B).

Figure 2:
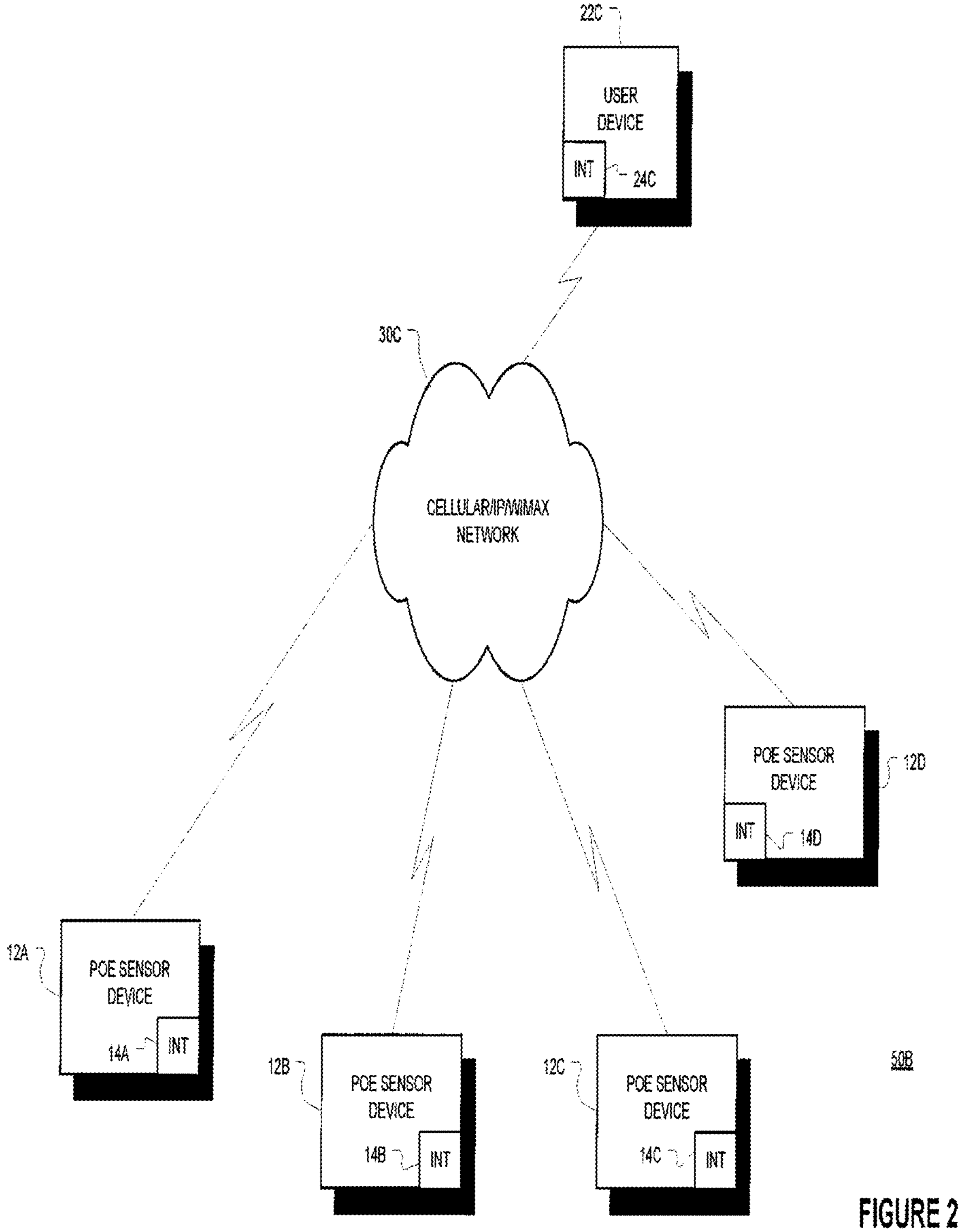
FIG. 2 is a block diagram of another intelligent Power over Ethernet (POE) sensor (IPS) architecture according to various embodiments.

FIG. 2 is a block diagram of a local intelligent POE sensor (IPS) architecture 50B according to various embodiments. As shown in FIG. 2, architecture 70B may include a UD 22C couplable to a plurality of IPS devices 12A-D via a network 30*e*. The network 30C may be a local network or a network of networks in an embodiment that include a combination of wired and wireless networks or connections. As noted, an IPS device 12A-E may include a sensor server 16A that can communicate sensor information directly with a UD 22C versus via an IPS processing system 40A, 40B. In an embodiment, an IPS device 12A-D may communicate sensor information with a UD 22C and IPS processing systems 40A, 40B.

Figure 3A:
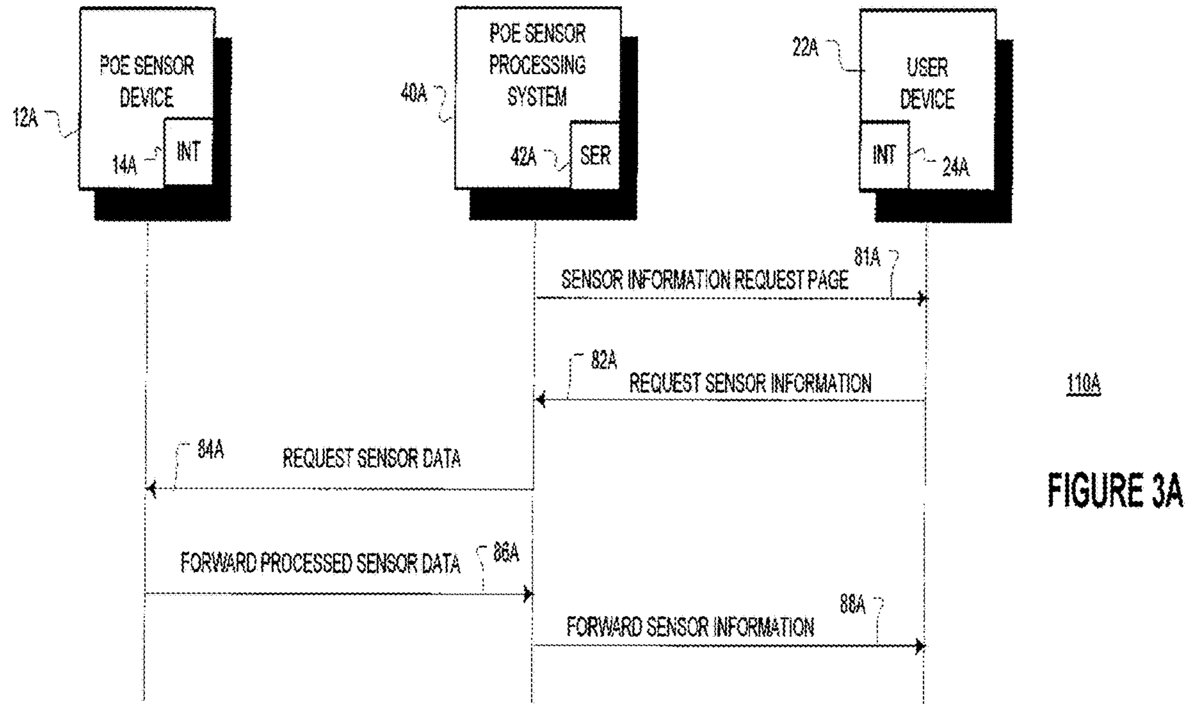
FIGS. 3A-3D are diagrams of communication between an intelligent POE sensor (IPS) device, an IPS processing system, and a User device in IPS architecture according to various embodiments.
Figure 3B:
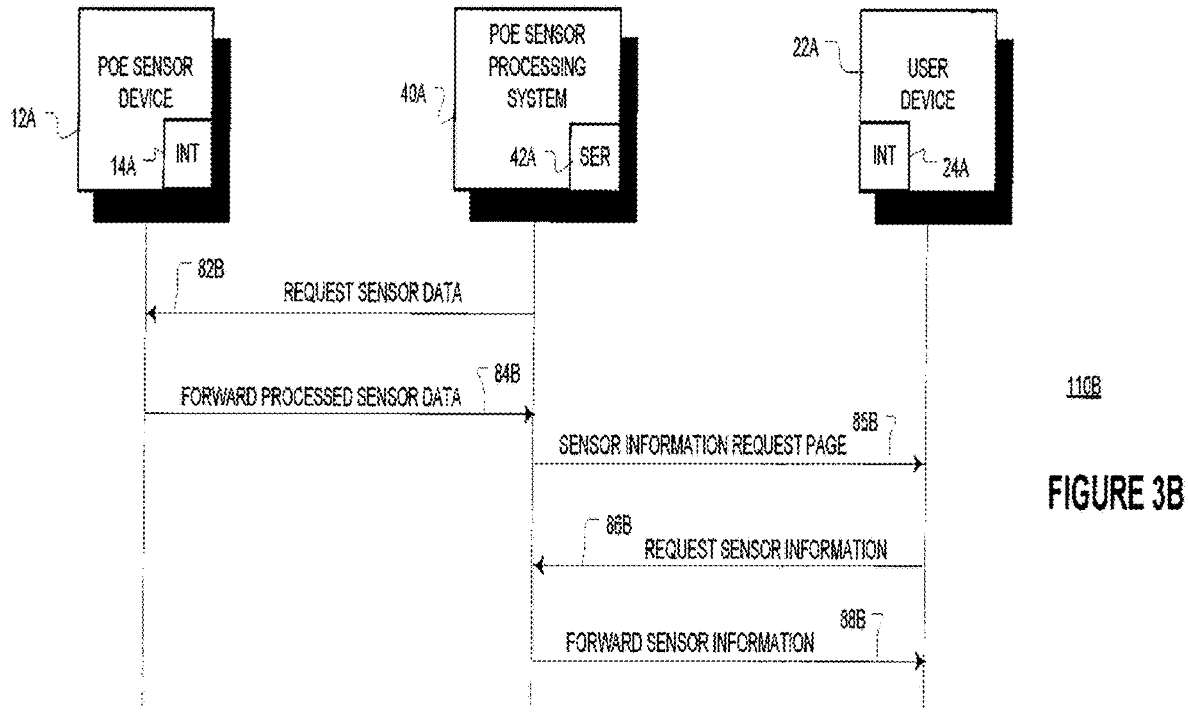
Figure 3C:
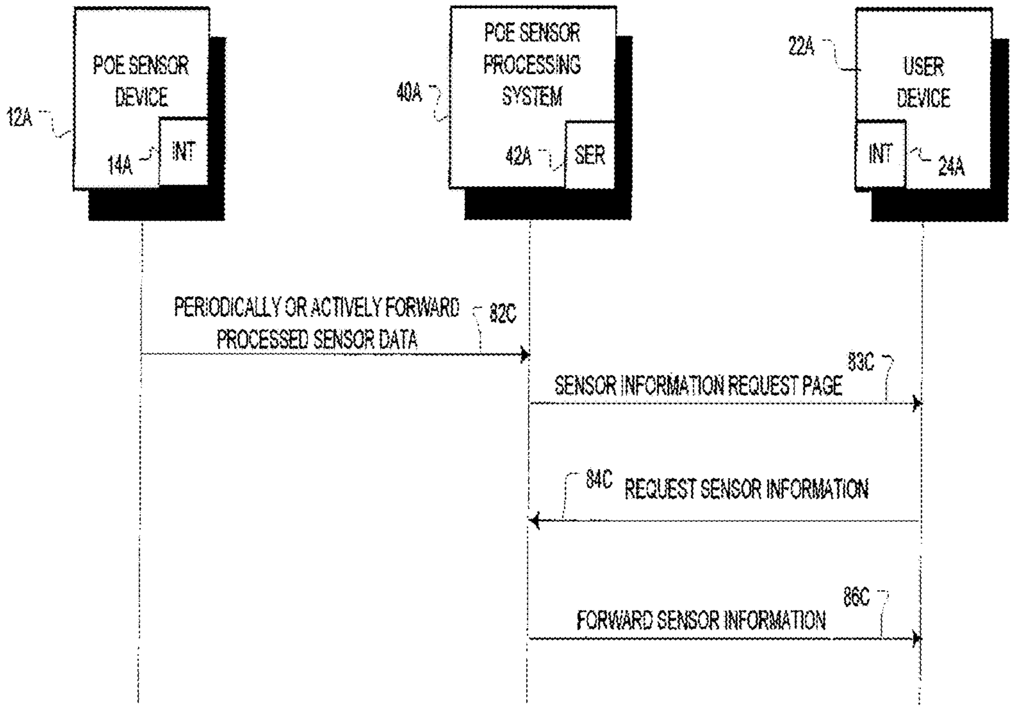
Figure 3D:
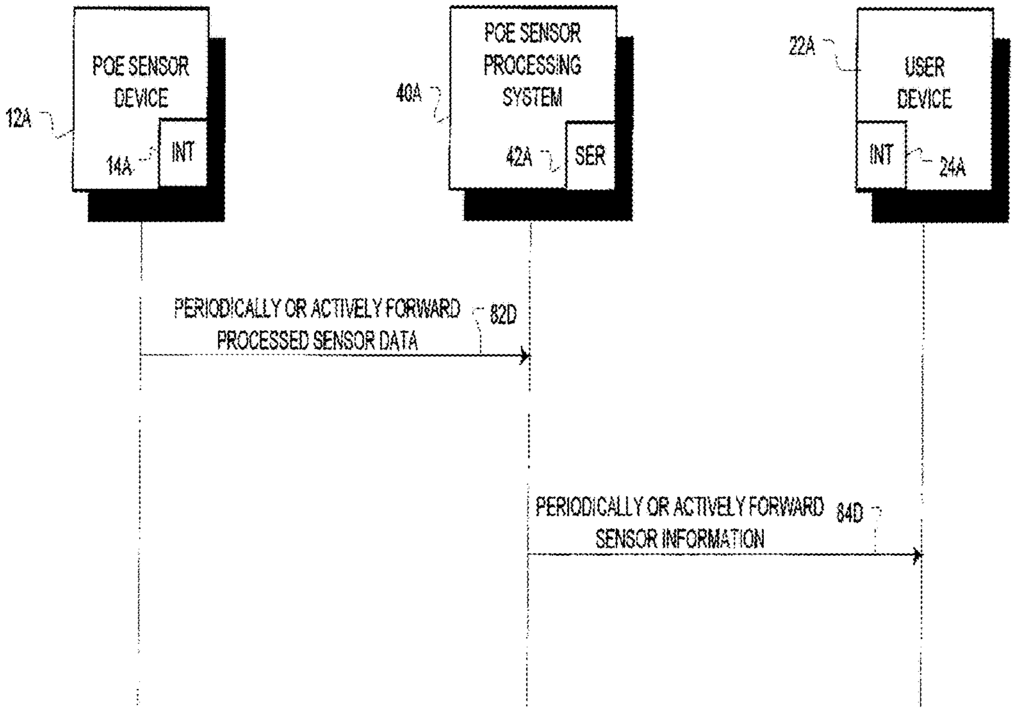
Figure 3E:
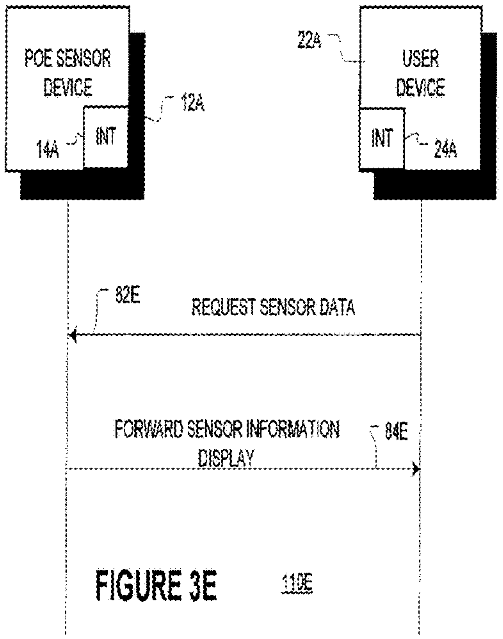
FIGS. 3E-3F are diagrams of communication between an intelligent POE sensor (IPS) device and a User device in IPS architecture according to various embodiments.
Figure 3F:
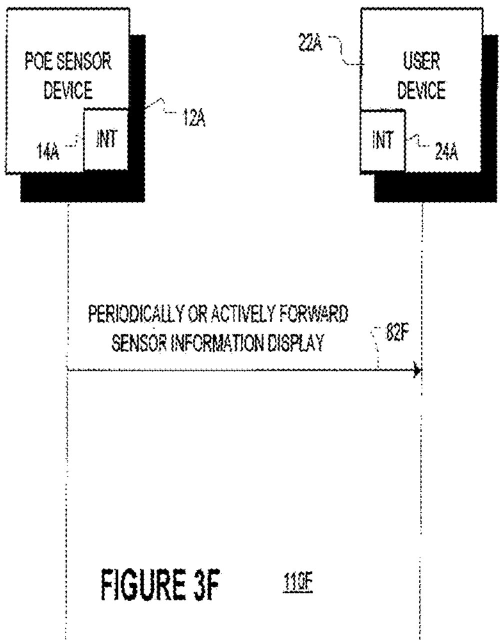
Figure 3G:
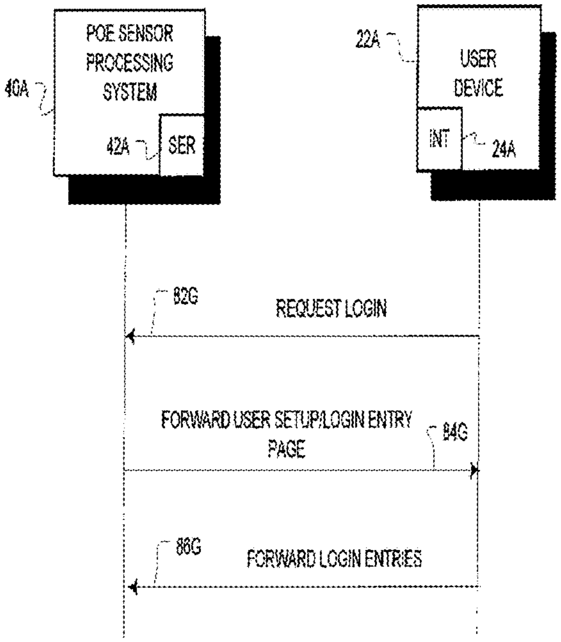
FIG. 3G is a diagram of communications between an intelligent POE sensor (IPS) processing system and a User device in IPS architecture according to various embodiments.

FIG. 3G is a diagram of a user setup/login communication 110G between a UD 22A and an IPS processing system 40A in IPS architecture 50A according to various embodiments. Via a UD 22A, a User 136 may generate a URL or URL login request 82G and send the request to an IPS processing system 40A, 40B via its interface 24A and networks 30A, 30B. Via the network 30A, 30B, IP protocols, and its transceiver 274 (FIG. 8B), an IPS processing system 40A may receive the URL/URL request 82G.

Figure 4A:
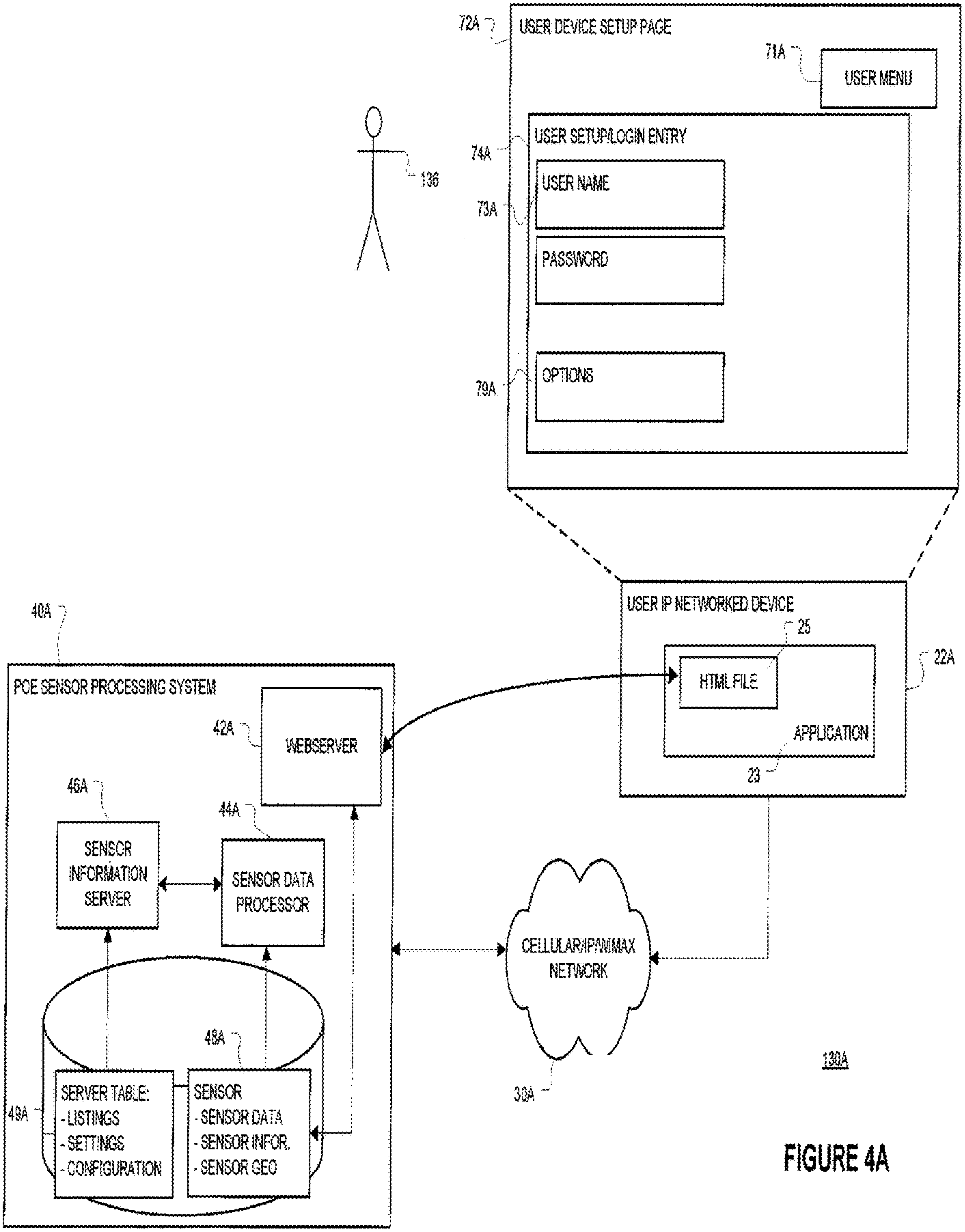
FIG. 4A is a block diagram of IPS architecture providing a user device setup/login web page via an IPS processing system according to various embodiments.

An IPS processing system 40A, 40B may provide a user setup/login entry page 84G (FIG. 3G) in communication 110G, page 74A, FIG. 4A, for a received URL or URL request 82G. The IPS processing system database 49A may include a table that links one or more users with a URL. In response to a received user setup/login entry page communication 84G (FIG. 3G) web page 72A, FIG. 4A, a user 136 via a UD 22A-22B may create an account or login to an account. A User 136 may be able to select a user name and password 73A (or enter same if registered to login) and select one or more options 79A or select a user menu 71A.

The options may include privacy settings, user demographics, a registered UD 22A-22B to be associated with the IPS processing system 40A, 40B, and other options and forward login entries via communication 86G.

Figure 4B:
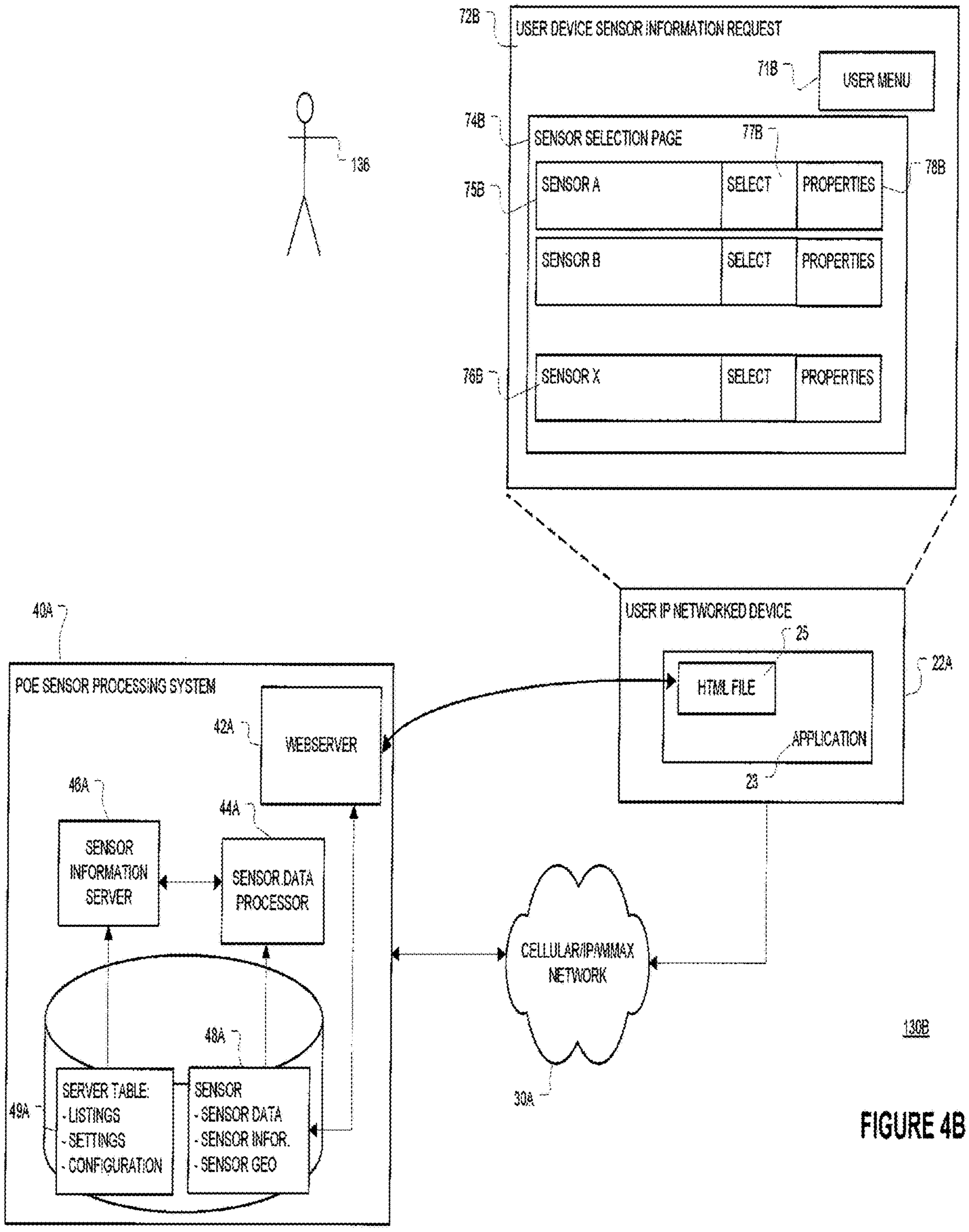
FIG. 4B is a block diagram of IPS architecture providing a sensor information request web page via an IPS processing system according to various embodiments.
Figure 4C:
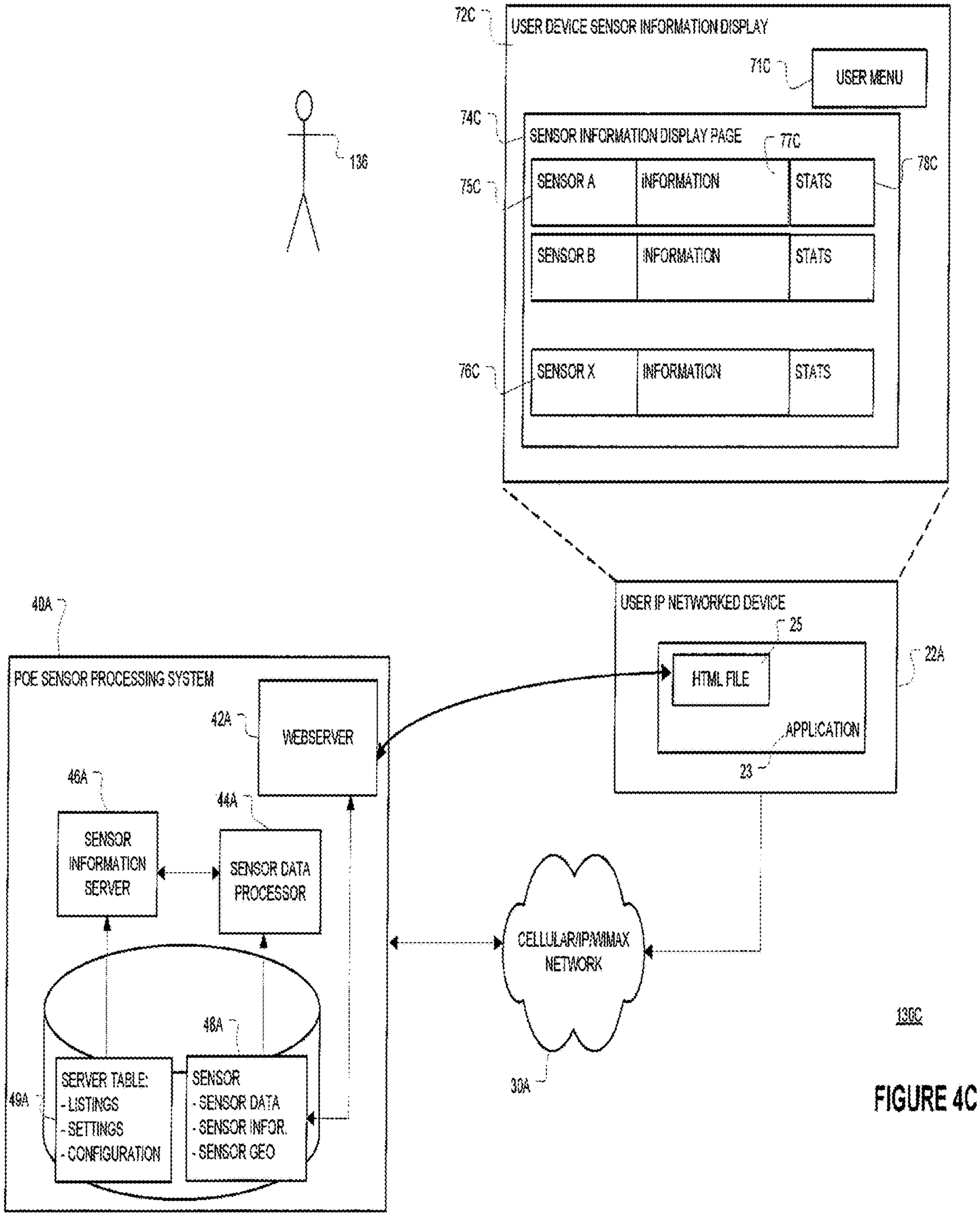
FIG. 4C is a block diagram of IPS architecture providing a sensor information display web page via an IPS processing system according to various embodiments.
Figure 4D:
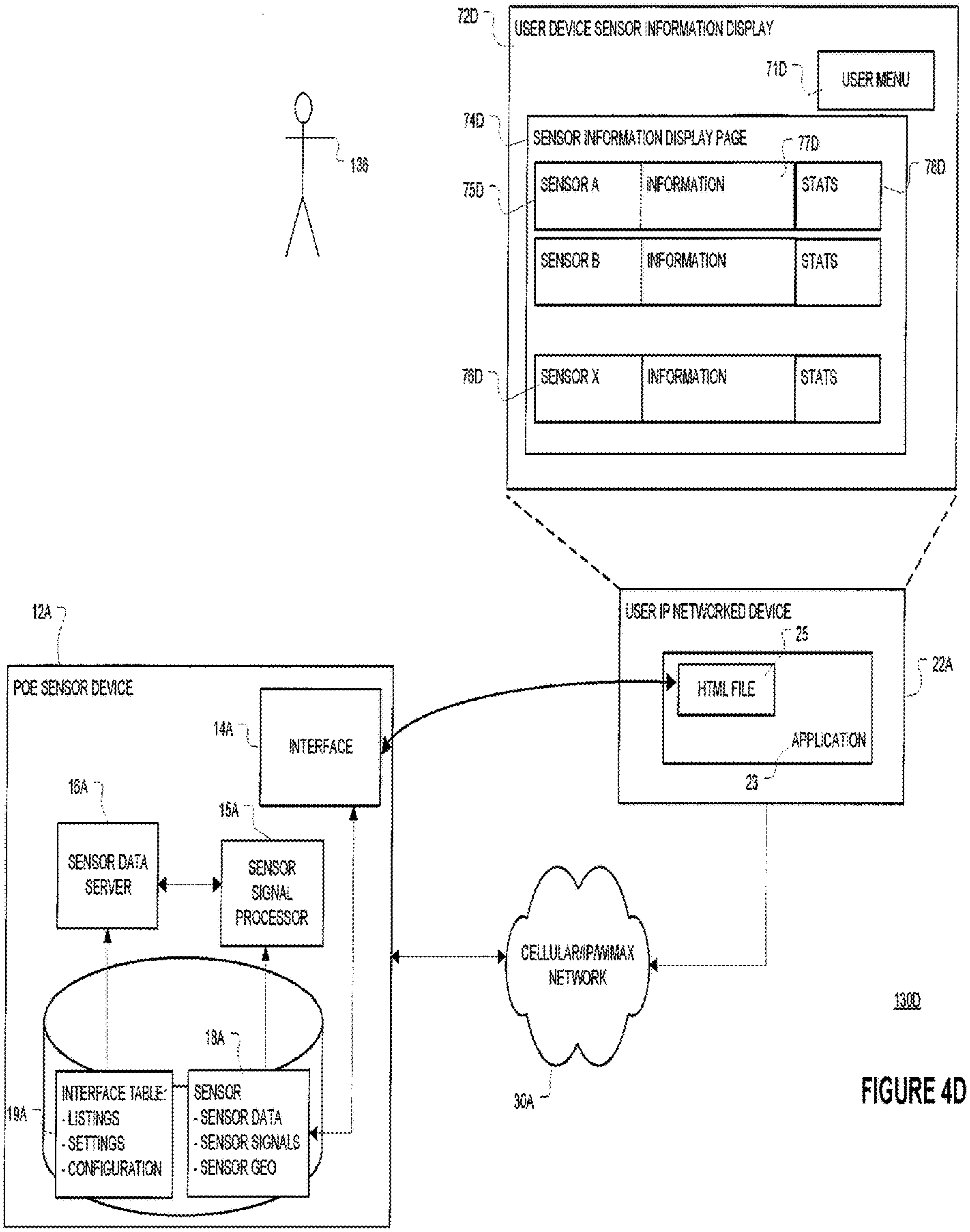
FIG. 4D is a block diagram of IPS architecture providing a sensor information display web page via an IPS device according to various embodiments.

Once a User 136 is registered/logged in an IPS processing system 40A, 40B (activity 174A), an IPS processing system 40A, 40B may provide a sensor information request web page 72B (FIG. 4B) communication 81A (FIG. 3A) via network 30A, 30B. A User 136 via a sensor information request web page 72B may select to receive information from one or more sensors A to X 75B to 76B (IPS device 12A-12E). The sensor page 74B may indicate the sensor type(s) and location. A User 136 may be able to control the mode of operation of a sensor A to X via the selection 77B and other controls via properties 78B. For example, a sensor of an IPS device 12A-12E may have multiple selectable modes of operation including a tilt sensor that have a 9-axis, uniaxial electrolytic (UE) tilt, and Bi-Axial mems mode as shown in FIG. 7D.

A UD 22A-22B may forward the User's selections on the sensor information request web page 72B to an IPS device 12A-12E via a request sensor information communication 82A (FIG. 3A). Based on the User's 136 sensor selections, an IPS processing system 40A, 40B may forward a sensor data request communication 84A to one or more associated IPS devices 12A-12E. An IPS device 12A-12E upon receipt of a request sensor data communication 84A may process, continue processing, or start recording and processing selected sensor data. An IPS device 12A-12E may include several modules shown in FIG. 5B and employ algorithm 140B shown in FIG. 6B to process sensor data and respond to sensor signal/information requests from an IPS processing system 40A-B or UD 22A-22C.

Figure 5A:
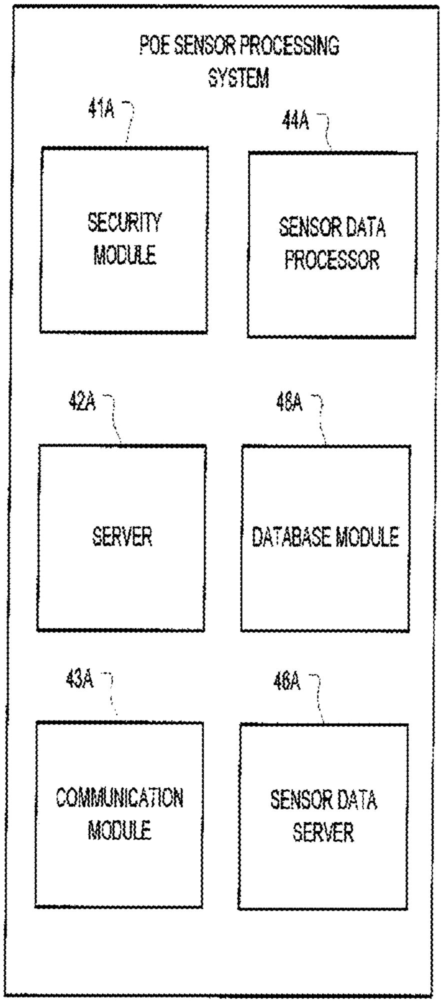
FIG. 5A is a block diagram of an IPS processing system according to various embodiments.
Figure 5B:
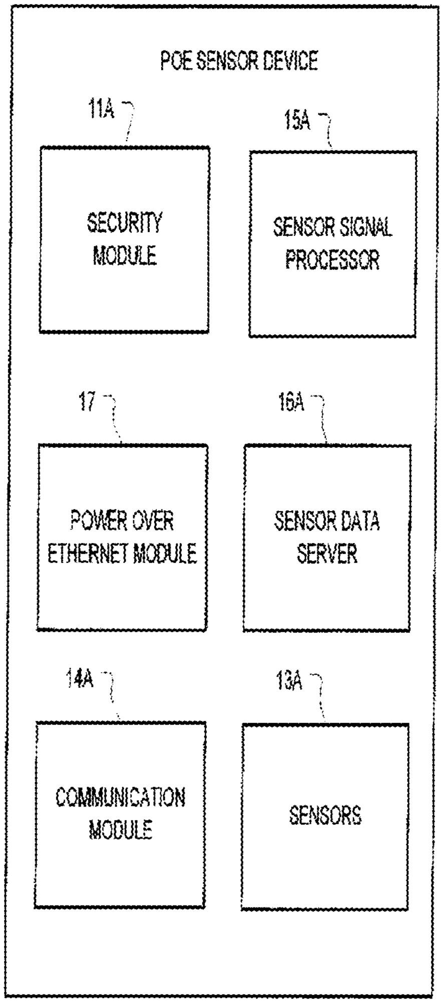
FIG. 5B is a block diagram of an IPS device according to various embodiments.

As shown in FIG. 5B, an IPS sensor device 12A-12E may include a security module 11A, one or more programmable sensors 13A, communication module 14A, sensor signal processor 15A, sensor data/signal server 16A, and power over Ethernet module 17. In order to provide sensor information directly to a UD 22A-22C as shown in FIG. 4D via a sensor information display 72D or in other applications, an IPS sensor device 12A-12E may further include an interface table 19A and sensor database 18A. The IPS sensor device 12A-12E may include the table 19A and sensor database 18A to process any sensor signal requests (from an IPS processing system 40A, 40B or UD 22A-22C).

The interface table 19A may include IPS processing system 40A, 40B or UD 22A-22C listing/registrations that may be employed by the security module 11A to ensure only authorized IPS processing systems 40A, 40B and UDs 22A-22C receive sensor signals/information. The sensor signals/information may be confidential or protected and include seismic data, acceleration data, tilt data, and other movement type data or signals where its knowledge may be protected or confidential in an embodiment (including monitoring possible nuclear activity). The table settings and configuration may be associated with IPS processing systems 40A, 40B, Users of a UD 22A-22C, and sensors of an IPS device 12A-12E.

The sensor database 18A may store raw sensor data, processed signal data (signals), and geographical data (where/when the sensor data was obtained). In an embodiment, an IPS device 12A-12E may process and store sensor data (activity 144B) when a sensor event occurs (activity 142B). A sensor event may include an automatic event set by a UD 22A-22C, IPS processing system 40A-40B, or IPS device 12A-12E configuration including sensor data exceeding a certain threshold. The sensor event may also include a time event, such as an automatic sample to be taken at periodic intervals. The time intervals for periodic sampling may also be set by a UD 22A-22C, IPS processing system 40A-40B, or IPS device 12A-12E configuration. A sensor event may also be a request from a UD 22A-22C, IPS processing system 40A-40B, or other IPS device 12A-12E for sensor information or signals.

In an embodiment, an IPS device 12A-E may process data sampled from one or more sensors 13A of the device 12A-E and may process the data based on selected configuration(s) to form sensor signals and other information including statistical information where the resultant signals and information may be stored in database 18A. An IPS device 12A-E may employ algorithms 160A-160E shown in FIGS. 7A to 7E to process position/movement-based sensor data 13A in an embodiment. The IPS device 12A-E sensor signal processor 15A may include one or more digital signal processors (DSP) or one or more application specific integrated circuits (ASIC) to process sensor data including to perform the algorithms 160A-160E shown in FIGS. 7A to 7E.

Figure 7A:
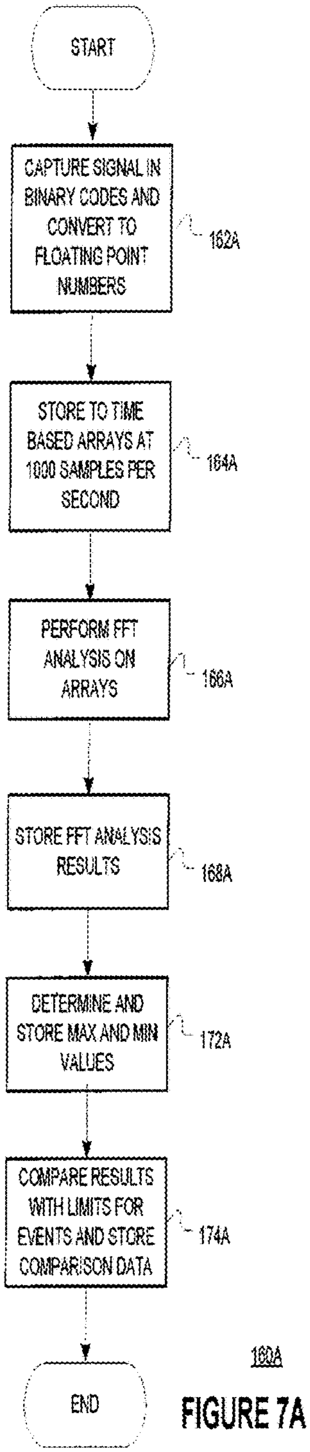
FIG. 7A-7E are flow diagrams illustrating several methods for processing sensor signals at an IPS device according to various embodiments.

For example, in the algorithm shown in FIG. 7A, the sensor signal processor 15A may conduct a Fast Fourier Transform (FFT) of time-based data arrays formed from captured signals converted to floating point numbers sampled 1000 times per second (activities 162A, 164A, and 166A). An IPS device 12A-E may store the FFT results or analysis in a database 18A (activity 168A) and determine and store max and min values (of the FFT results) in the database 18*a* (activity 172A). The IPS device 12A-E may further compare the max-min values to preset limits to determine if an event has occurred and store the analysis in the database 18A (activity 174A).

Figure 7B:
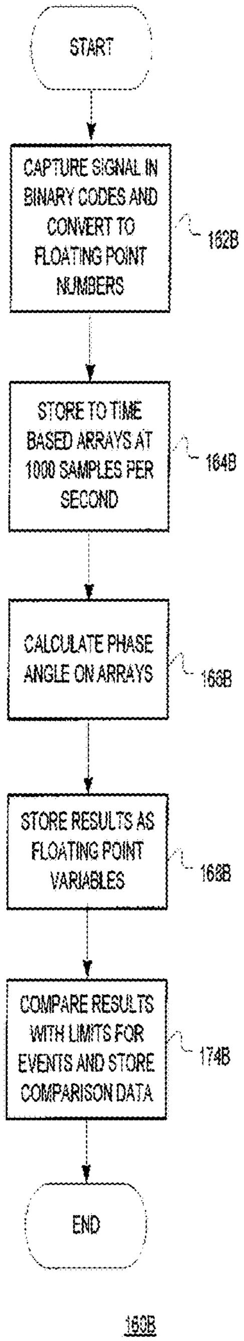

In another embodiment as a function of sensor configurations, an IPS device 12A-E may employ algorithm 160B shown in FIG. 7B to process sensor data. In algorithm 160B, the sensor signal processor 15A may calculate phase angles of time-based data arrays formed from captured signals converted to floating point numbers sampled 1000 times per second (activities 162B, 164B, and 166B). An IPS device 12A-E may store the phase angle calculations in a database 18A (activity 168B) and determine and store max and min values (of the phase angle calculations) in the database 18*a* (activity 172B). The IPS device 12A-E may further compare the max-min values to preset limits to determine if an event has occurred and store the analysis in the database 18A (activity 174B).

Figure 7C:
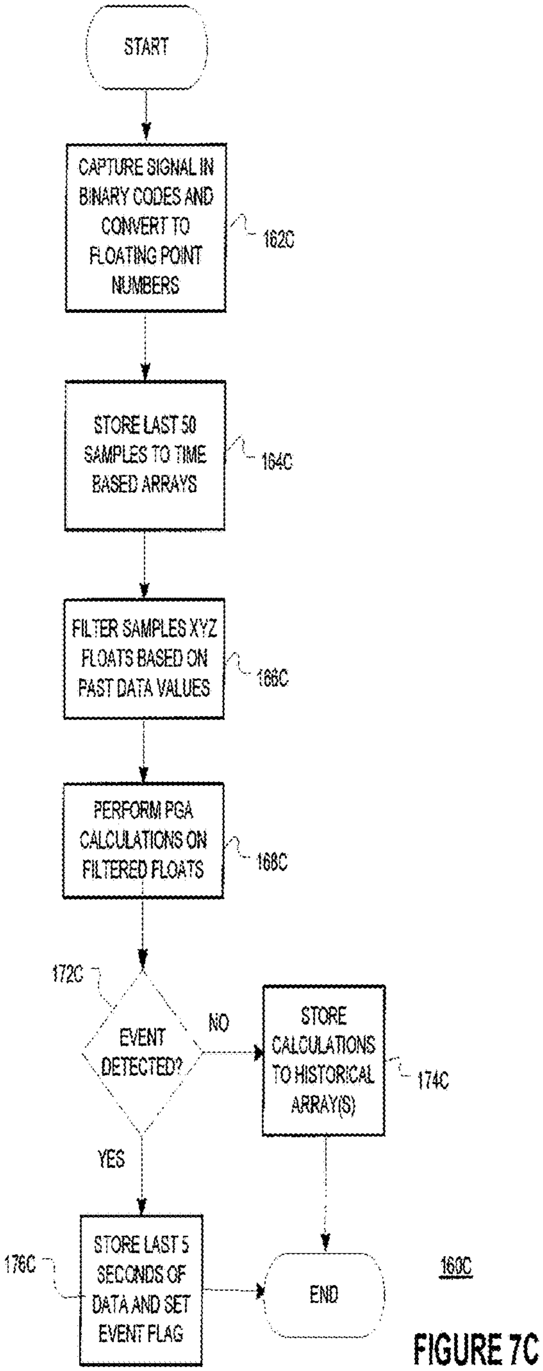
Figure 7D:
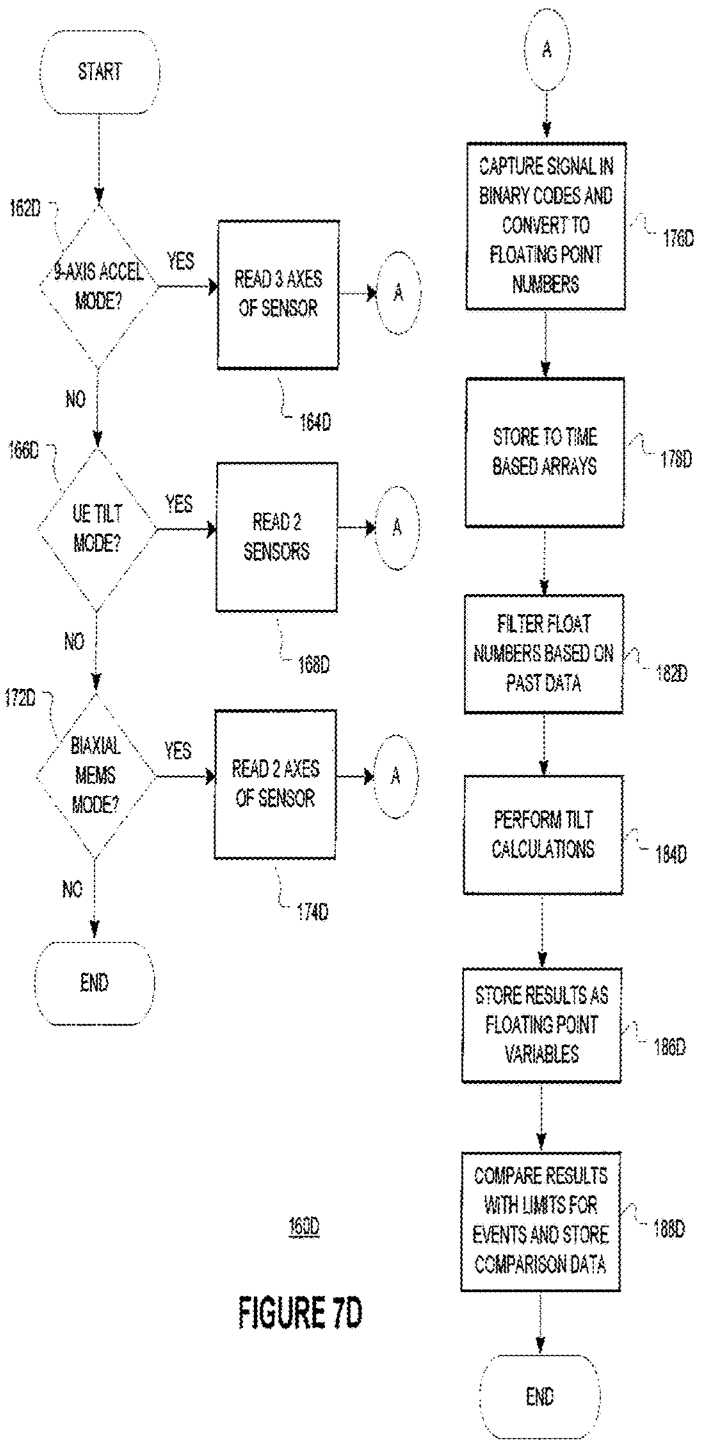

In a further embodiment as a function of sensor configurations, an IPS device 12A-E may employ algorithm 160C shown in FIG. 7C to process sensor data. In algorithm 160C, the sensor signal processor 15A may XYZ filter the 50 samples of data converted to floating point numbers based on past data values (activities 162C, 164C, and 166C). The sensor signal processor 15A may then perform programmable gate array (PGA) calculations on filtered floats to determine if an event has occurred (activities 168C and 172C). An IPS device 12A-E may store the calculations in a database 18A (activity 174C) when an event is not detected (activity 172C). An IPS device 12A-E may store the last 5 seconds of data and related calculations in the database 18A and set an event flag when an event is detected (activity 172C and 174C).

In algorithm 160D, an IPS device 12A-E may direct sensors 13A to collect one of three types of data as a function of the selected mode of operation or configurations (activities 162D-174D). In 9-axis accelerometer mode (activity 162D), a 9-axis accelerometer sensor 13A may be directed to read 3 axes (activity 164D). In uniaxial electrolytic (UE)

tilt mode, (activity 166D), a uniaxial electrolytic (UE) tilt sensor 13A may be directed to read 2 sensors (activity 164D). In biaxial mems mode, (activity 172D), a biaxial mems sensor 13A may be directed to read 2 axes (activity 174D).

In each mode, a sensor signal processor 15A may capture the resultant data in binary codes and convert the binary codes to floating point numbers that are stored in time-based arrays stored in database 18A (activities 176D and 178D). A sensor signal processor 15A may filter the floating-point numbers based on past data and perform tilt calculations on the filtered data (activities 182D and 184D). An IPS device 12A-E may store the results or analysis as floating-point variables in a database 18A (activity 186D). The IPS device 12A-E may further compare the results to preset limits to determine if an event has occurred and store the analysis in the database 18A (activity 188D).

Figure 7E:
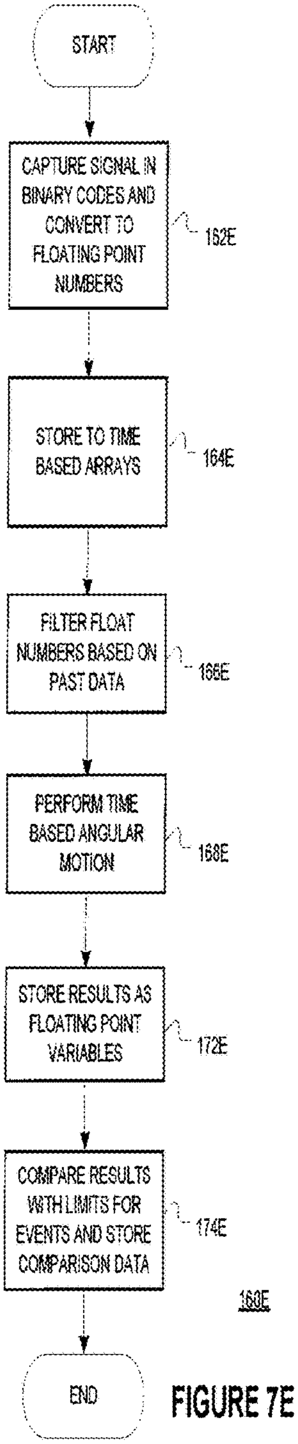

An IPS device 12A-E via sensor signal processor 15A may perform other algorithms to process sensor data including algorithm 160E show in FIG. 7E. In algorithm 160E, a sensor signal processor 15A may capture sensor data in binary codes and convert the binary codes to floating point numbers that are stored in time-based arrays stored in database 18A (activities 162E and 164E). A sensor signal processor 15A may filter the floating-point numbers based on past data and determined the time-based angular motion of the filtered data (activities 166E and 168E). An IPS device 12A-E may store the results or analysis as floating-point variables in a database 18A (activity 172E). The IPS device 12A-E may further compare the results to preset limits to determine if an event has occurred and store the analysis in the database 18A (activity 174E).

Figure 6A:
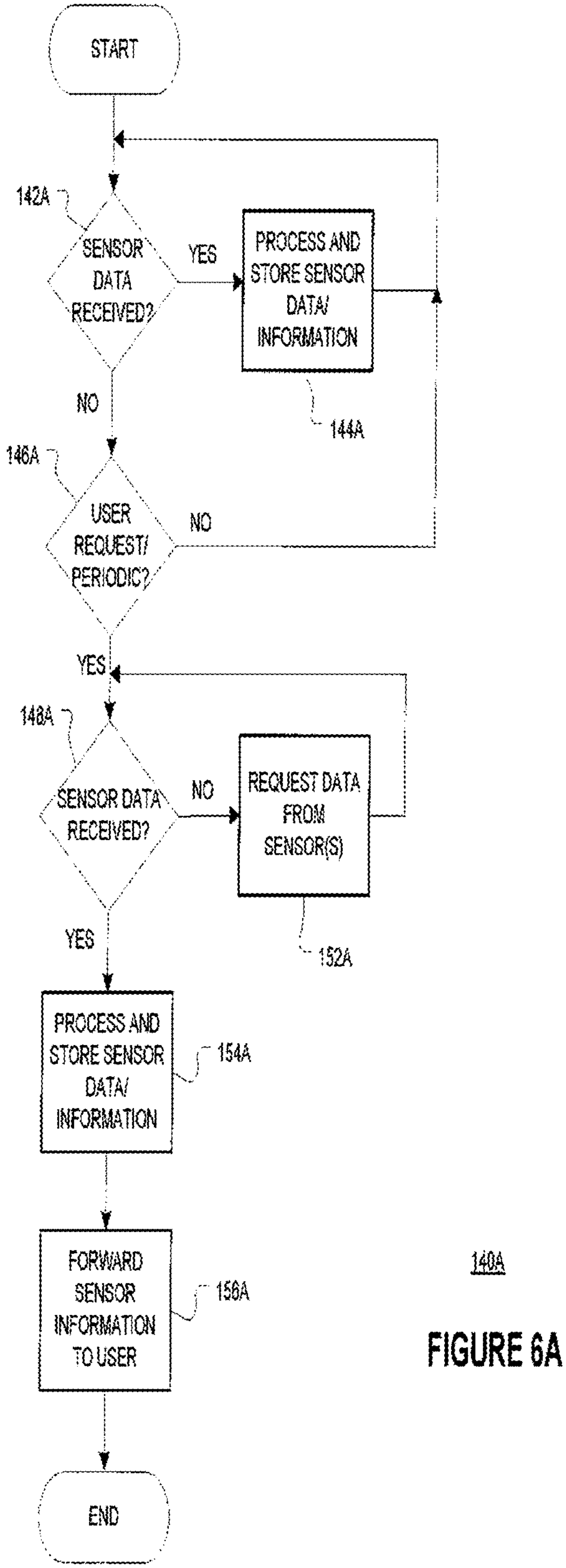
FIG. 6A is a flow diagram illustrating several methods for execution by an IPS processing system according to various embodiments.
Figure 6B:
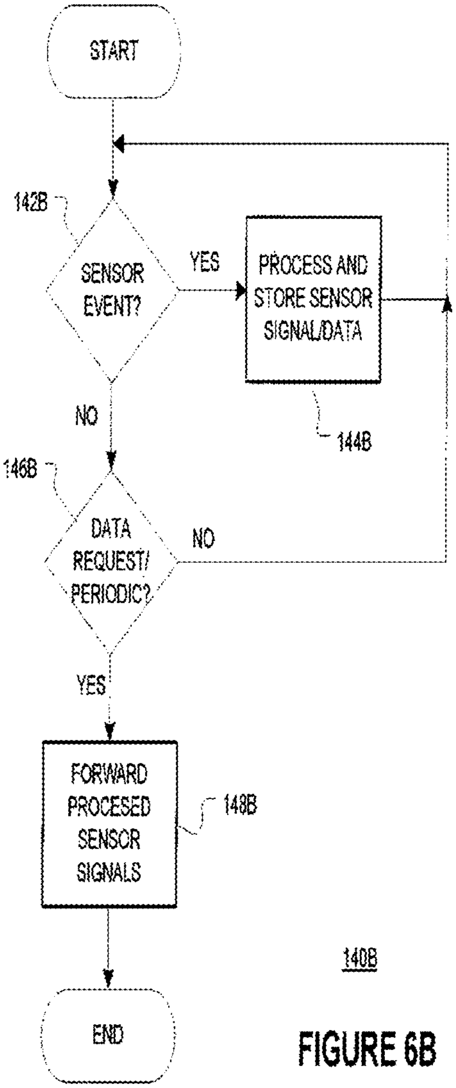
FIG. 6B is a flow diagram illustrating several methods for execution by an IPS device according to various embodiments.

Returning to algorithm 140B of FIG. 6B, an IPS device 12A-12E may forward processed sensors signals to IPS processing systems 40A-40B or a user device sensor information display 72D as shown in FIG. 4D to a UD 22A-C. In an embodiment, an IPS device 12A-12E may forward the processed sensor data upon request (communication 86A in FIG. 3A) or periodically (communication 82C in FIG. 3C) to IPS processing systems 40A-40B. Similarly, an IPS device 12A-12E may forward the user device sensor information display 72D upon request (communications 82E and 84E in FIG. 3E) or periodically (communications 82F and 84F in FIG. 3F) to a UD 22A-C.

In an embodiment, an IPS processing system 40A, 40B may include several modules shown in FIG. 5A and employ algorithm 140A shown in FIG. 6A to process sensor data and respond to sensor signal/information requests from a UD 22A-22C. As shown in FIG. 5A, an IPS processing system 40A-40B may include a security module 41A, a sensor data processor 44A, a server 42A, a sensor data server 46A, a communications module 43A, and a database 48A. The security module 41 A may process login and registrations requests via display 72A shown in FIG. 4A to verify a User 136 or their device 22A-22C is authorized to receive sensor information. In algorithm 140A, once sensor data or signals are received from an IPS device 12A-12E (activity 142A), the sensor signals may be processed via sensor signal processor 44A and stored in database 48A (activity 144A). The sensor signal processor 44A may include a DSP or ASIC and perform additional analysis on the processed sensor data in an embodiment.

When a User 136 requests sensor information or information is to be periodically provided to a User 136 via their UD 22A-C (activity 146A), and sensor information has not been received (activity 148A), the communications module 43A may request sensor signals from one or more IPS devices 12A-12E (activity 152A). Otherwise, received sensor signals may be processed via sensor signal processor 44A and stored in database 48A (activity 154A), formatted via sensor data server 46A, and forwarded to the User 136 via their UD 22A-C via the server 42A and communication module 43A (in an HTML page in an embodiment) (activity 156A). As shown in FIGS. 4C and 4D, sensor information display page 74C, 74D may include sensor A to X 75C to 76C information displayed in various formats 77C and related statistical information 78C.

FIG. 8A illustrates a block diagram of a device 230 that may be employed at least in part in an IPS device 12A-12D or UD 22A-22C in various embodiments. The device 230 may include a central processing unit (CPU) 232, a random-access memory (RAM) 234, a read only memory (ROM) 237, a POE modem/transceiver 244, a display 247, a camera 256, a speaker 245, a rechargeable electrical storage element 256, analog sensors 254A, digital sensors 254B, analog to digital (AID) converter 255, and an antenna 246. The CPU 232 may include digital sensors 254B. Analog sensors may communicate digital signals to the CPU 232 via the AID converter 255. The RAM 234 may include a queue or table 248 where the queue 248 may be used to store sensor data/signals/information. The RAM 234 may also include program, algorithm, and system data and instructions. The rechargeable electrical storage element may be a battery or capacitor in an embodiment.

The POE modem/transceiver 244 may couple, in a well-known manner, the device 230 to a wired, wireless, or combination of both network 30A, 30B to enable communication with an IPS processing system 40A-40D. The modem/transceiver 244 may also be able to receive global positioning signals (GPS) and the CPU 232 may be able to convert the GPS signals to location data that may be stored in the RAM 234. The ROM 237 may store program instructions to be executed by the CPU 232 or control interface 254 (applications 237A). The applications 237A maya web browser program or application. The RAM 234 may also be used to store program sensor information, queues, databases, and overhead information.

Figure 8B:
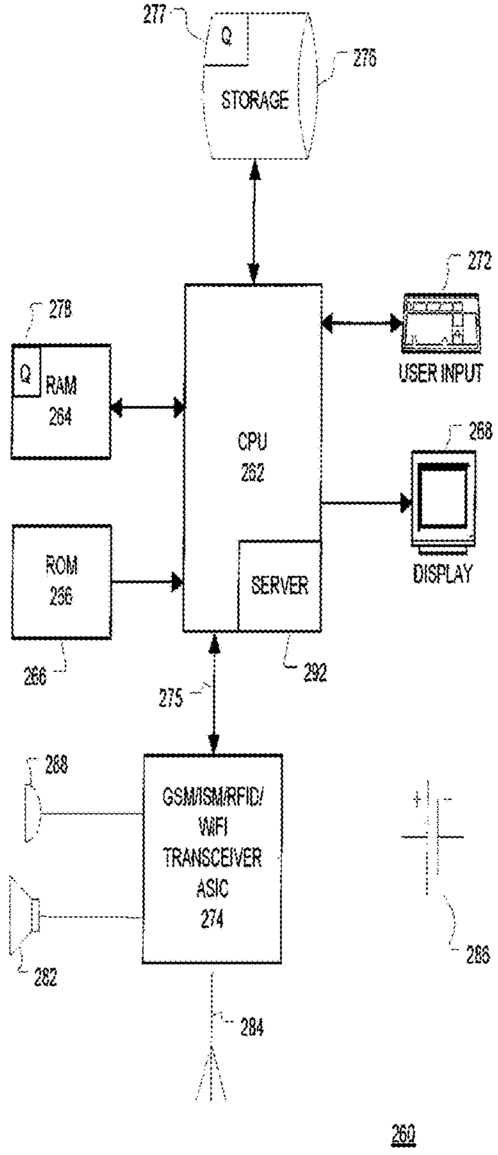
FIG. 8B is a block diagram of an article according to various embodiments.

FIG. 8B illustrates a block diagram of a device 260 that may be employed at least in part in an IPS processing system 40A-40D in various embodiments. The device 260 may include a central processing unit (CPU) 262, a random-access memory (RAM) 264, a read only memory (ROM) 266, a display 268, a user input device 272, a transceiver application specific integrated circuit (ASIC) 274, a microphone 288, a speaker 282, storage 276, electrical energy storage unit 286, and an antenna 284. The CPU 262 may include a server 292. The RAM 264 may include a queue 278 where the queue 278 may store sensor data/signals/information. The server 292 may function as the web-server/42A, 42B of the IPS processing system 40A, 40B.

The ROM 266 is coupled to the CPU 262 and may store the program instructions to be executed by the CPU 262 and the server 292. The ROM 266 may include applications and instructions for the security module 41 A, server 42A, communication module 43A, sensor data processor 44A, sensor data server 46A, and database module 48A. The RAM 264 may be coupled to the CPU 262 and may store temporary program data, overhead information, sensor data, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include sensor data, signals, and information, or web pages to be transmitted, or protocol information. The transceiver ASIC 274 may include an instruction set necessary to communicate messages or web pages via network 30A, 30B. The ASIC 274 may be coupled to the antenna 284 to communicate messages, content, or pages wireless. When a message is received by the transceiver ASIC 274, its corresponding data may be transferred to the CPU 262 via the serial bus 276. The data can include wireless protocol, overhead information, sensor, and pages to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, and databases 48, 49.

Any of the components previously described can be implemented in a number of ways, including embodiments in software. Any of the components previously described can be implemented in a number of ways, including embodiments in software. Thus, the devices 230, 260 elements including the RAM 234, ROM 237, CPU 232, transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

The invention claimed is:

1. A sensor apparatus including:

a plurality of sensors, each sensor including a plurality of selectable modes of operation for measuring a physical attribute and providing a signal representative of the measured physical attribute based on the selected mode of operation; and a communications module transceiving data signals including:

receiving digital data signals via a wired connection, receiving power sufficient to operate the sensor apparatus via the digital data signals, the received digital data signals selecting the mode of operation of one of the plurality of selectable modes of operation for one of the plurality of sensors, and sending digital data signals representing the measured physical attribute of the one of the plurality of sensors based on the selected mode of operation of the plurality of selectable modes of operation for the one of the plurality of sensors.

* * * * *